(12) United States Patent
Maeda et al.

(10) Patent No.: US 6,356,259 B1
(45) Date of Patent: Mar. 12, 2002

(54) TOUCH-PANEL INPUT DEVICE

(75) Inventors: Toshifumi Maeda; Hiroshi Tanaka, both of Toyama-Ken (JP)

(73) Assignee: SMK Corporation (JP)

( * ) Notice: Subject to any disclaimer, the term of this patent is extended or adjusted under 35 U.S.C. 154(b) by 0 days.

(21) Appl. No.: 09/352,219

(22) Filed: Jul. 13, 1999

(30) Foreign Application Priority Data

Jul. 15, 1998 (JP) .......................................... 10-199954

(51) Int. Cl.[7] .......................... G09G 5/00; B32B 17/00; H01H 11/00; G06K 11/06
(52) U.S. Cl. ........................... 345/173; 156/99; 29/622; 178/18.03
(58) Field of Search ................................. 345/173, 174, 345/104; 178/18.01, 18.03, 18.05, 18.06, 18.07; 341/20, 34; 156/99, 104, 107, 295, 350, 292; 522/95, 96, 98, 100, 103, 170; 29/622

(56) References Cited

U.S. PATENT DOCUMENTS

| | | | | |
|---|---|---|---|---|
| 4,299,639 A | * | 11/1981 | Bayer ........................... | 156/99 |
| 4,985,523 A | * | 1/1991 | Mochizuki et al. ........... | 522/96 |
| 5,086,088 A | * | 2/1992 | Kitano et al. ................ | 522/170 |
| 5,684,094 A | * | 11/1997 | Suzuki et al. ................ | 525/403 |
| 5,835,080 A | * | 11/1998 | Beeteson et al. ........... | 345/173 |
| 5,844,175 A | * | 12/1998 | Nakanishi et al. ........ | 178/18.03 |
| 5,883,148 A | * | 3/1999 | Lewandowski et al. ........ | 522/95 |
| 5,955,198 A | * | 9/1999 | Hashimoto et al. ...... | 178/18.03 |

\* cited by examiner

*Primary Examiner*—Steven Saras
*Assistant Examiner*—Paul A Bell
(74) *Attorney, Agent, or Firm*—Morrison Law Firm

(57) ABSTRACT

Two transparent conductive panels are separated by a perimeter of elastic adhesive that forms a sealed gap in which transparent insulative fluid is interposed. The fluid has a refraction index close to that of the panels to improve light transmittance through the device. The small width of the gap improves response time and prevents formation of a vacuum in the gap. The panels are connected to a position detection circuit that determines coordinate position of an applied pressure point. Spacers in the gap reduce the chance of accidental large-area contact which would result in an erroneous position command. The elasticity of the adhesive and the small gap width provide better temperature variation tolerance in addition to improved consistency and reliability of operation.

29 Claims, 4 Drawing Sheets

Prior Art

TOUCH-PANEL INPUT DEVICE

BACKGROUND OF THE INVENTION

The present invention relates to a touch-panel input device overlayed on a liquid crystal panel, CRT or the like. An operator presses the device in a position corresponding to displayed information. The device determines the position pressed and sends appropriate command input data to a processing device such as a personal computer. The source of pressure on the device can be from a pen, finger or the like. More specifically, the present invention relates to a touch-panel input device that achieves improved visibility by sealing a transparent insulative fluid between transparent plates.

In general, touch-panel input devices are found on the display screen of a liquid crystal panel, CRT, or the like where an operator can select information by touching an appropriate area of the display. The touch-panel input device reacts to pressure applied to a transparent surface to indicate a specific position according to the contents of the display. The touch-panel device detects the display position selected and generates corresponding command input data. The generated command input data is then sent to a processing device such as a personal computer.

Touch-panel input devices of this type generally contain a movable plat positioned over a substrate. The substrate and movable plate are constructed to maintain a gap between the movable plate and the substrate when they are overlayed. The substrate and movable plate have conductive layers on the surfaces that face each other across the insulative gap. The conductive layers are made from transparent materials to provide visual access to the display screen. However, the presence of air between the substrate and the movable plate creates a large refraction index differential. This large refraction index differential results in a transmittance efficiency of 80%, making the screen difficult to view.

The difficulty in viewing the display screen is addressed in touch-panel input devices such as in Japanese laid-open patent publication number 64-14630 and Japanese laid-open patent publication number 2-105916. These publications disclose a solution to the above difficulty by injecting a transparent, insulative fluid between the substrate and the movable plate. The fluid has a refraction index that is close to that of the materials used in the substrate and the movable plate, thus reducing reflectivity and improving transmittance.

Referring to FIG. 4 and FIG. 5, there is shown a conventional touch-panel input device 100. A thin transparent plate 101 is a movable plate and transparent substrate 102 is a thick substrate that faces a display device (not shown). A frame-shaped spacer 105 is layered between transparent plate 101 and transparent substrate 102 to form a slight gap.

Transparent conductor layers 103, 104 are composed of an Indium Tin Oxide (ITO) film or the like, printed on the facing surfaces of transparent plate 101 and transparent substrate 102. The ITO film is printed on the facing surfaces with a uniform thickness. Leads 103a, 103b, 104a and 104b are also printed on these facing surfaces to provide electrical connections for transparent conductor layers 103, 104. A voltage generated at a contact point between transparent conductor layers 103, 104 is measured on the electrical path provided by leads 103a, 103b, 104a and 104b. The measured voltage at the contact point enables detection of the position at which transparent plate 101 is pressed.

Transparent conductor layers 103, 104 are usually separated by spacer 105. Dot spacers 106 are printed on transparent conductor layer 104 at regular intervals sufficient to prevent light pressure applied to transparent plate 101 from causing accidental contact between the transparent conductor layers 103, 104. Dot spacers 106 are composed of an insulative composite resin such as epoxy resin. Dot spacers 106 augment the gap separation provided by spacer 105 to prevent position from being detected when transparent plate 101 is accidentally or lightly touched.

Spacer 105 is composed of a tacking agent 105b applied to upper and lower surfaces of a thin plate 105a. A sealed space between transparent conductor layers 103, 104 and within spacer 105 is formed by tacking thin plate 105a to transparent plate 101 and transparent substrate 102. Thin plate 105a is tacked to transparent plate 101 and transparent substrate 102 at the perimeters of transparent conductor layers 103, 104.

Transparent plate 101 can move horizontally (in the direction indicated by the arrow in FIG. 5) over tacking agent 105b while maintaining a sealed space between transparent conductor layers 103, 104. This configuration provides a close, tight contact between transparent plate 101 and spacer 105, while at the same time permitting transparent plate 101 to move elastically over thin plate 105a in a horizontal direction. When pressure is applied to transparent plate 101, the region surrounding the point of contact is uniformly flexed toward transparent substrate 102. The flexure of transparent plate 101 remains uniform, even if the point of contact is near spacer 105 in a perimeter region of transparent plate 101.

Once a sealed space between transparent conductor layers 103, 104 is achieved, a transparent insulative fluid 107 is injected into the space. Transparent insulative fluid 107 has a refraction index that is relatively close to the refraction indices for the transparent conductor layers 103, 104. For example, ITO has a refraction index of 1.9, while silicon oil, an example of a transparent insulative fluid 107, has a refraction index of 1.4.

Interposing transparent insulative fluid 107 between transparent conductor layers 103, 104 reduces the amount of light reflected by touch-panel input device 100 when exposed to an illumination source (not shown) located above touch-panel input device 100. Since transparent insulative fluid 107 has a refraction index relatively close to that of transparent conductor layers 103, 104, overall light transmittance increases to around 90%. The light reflected by touch-panel input device 100 is correspondingly reduced, thus significantly improving visibility of the display screen.

In this conventional touch-panel input device 100, spacer 105 determines the width of the gap between transparent conductor layers 103, 104. The width of the gap is therefore determined by tacking agent 105b and frame-shaped thin plate 105a, which make up spacer 105. The width of the gap is determined when tacking agent 105b is applied to upper and lower surfaces of thin plate 105a. This gap is generally in the range of from 60 to 300 microns.

When the device is operated, pressure applied to transparent plate 101 displaces transparent insulative fluid 107 and contact is made between transparent conductor layers 103, 104. Generally, a large amount of transparent insulative fluid 107 is interposed between transparent conductor layers 103, 104. Therefore, excessive pressure is required to close the gap of from 60 to 300 microns and cause transparent conductive layers 103, 104 to contact each other.

Moreover, when the applied pressure is released, transparent plate 101 is not restored to its original position immediately. A large amount of transparent insulative fluid 107 must return to the point of contact between the transparent conductor layers 103, 104 before transparent plate 101 is completely restored to its original position. The requirement for flow of a large volume of transparent insulative fluid 107 to the contact point makes restoration of the position of transparent plate 101 slow. This slow restoration makes the touch-panel input device 100 and screen combination difficult to use. Problems attendant with the use of the combination include such difficulties as, for example, slow responsiveness and lingering Newton rings on the operating surface caused by light interference.

In addition, a vacuum cavity is produced in an upper section of touch-panel input device 100 when the device is tilted. The vacuum cavity is produced due to the large gap between transparent conductor layers 103, 104 which permits the weight of transparent insulative fluid 107 to overcome surface tension when the device is tilted. The resultant vacuum cavity causes reduced light transmittance and malfunctions in the device.

Furthermore, touch-panel input device 100 can be configured for use as an input device in a mounted vehicle navigation system. The demands of such an application require the device to function in environments of 70 degrees Celsius or higher. The relatively large gap between transparent conductor layers 103, 104 provides the capacity for a large quantity of transparent insulative fluid 107 to be interposed therebetween. When this relatively large quantity of transparent insulative fluid 107 is warmed to environmental temperatures, it experiences thermal expansion. Escape openings must be provided for transparent insulative fluid 107 to expand in the sealed space without damaging touch-panel input device 100. Such escape openings communicate between the sealed space and an external environment of the device. Providing such escape openings, however, creates the additional problem of transparent insulative fluid 107 leaking from the device and becoming oxidized upon contact with external air.

The above described problems could be overcome by narrowing the gap between the transparent conductor layers 103, 104, thus reducing the capacity of the space therebetween for containing transparent insulative fluid. However, utilizing spacer 105 to provide such a narrow gap construction limits the gap width to greater than 50 microns. A more desirable, narrower gap is not possible according to the construction of spacer 105 when formed by applying tacking agent 105b to both sides of thin plate 105a.

Moreover, tacking agent 105b is formed by dissolving a tacky binder in a solvent. The use of the solvent creates the possibility of the solvent dissolving into transparent insulative fluid 107. Such a dissolution of solvent in transparent insulative fluid 107 adversely affects the transparency and insulative properties thereof.

Alternatively, spacer 105 can be replaced with a reactive adhesive used to bind transparent plate 101 and transparent substrate 102. Such a construction produces a gap between transparent conductive layers 103, 104 corresponding to the height of the adhesive layer. Using such a construction technique, the height of the adhesive layer can be suitably modified to reduce the width of the gap.

However, application of the above described reactive adhesive to the touch-panel device 100 causes transparent plate 101 to be rigidly fixed to transparent plate 102. When the two plates are fixed in such a manner as described, the configuration prevents elastic horizontal movement of transparent plate 101. Pressure applied to transparent plate 101 near the adhesive layer in the above described configuration causes transparent plate 101 to be pulled toward the adhesive layer. Transparent plate 101 lapses into a position in which it tilts significantly. This problem can result in detection errors due to discrepancies in the position being pressed and that which is actually sensed. Detection errors can also occur if the transparent conductor layer 103 fails to reach the transparent conductor layer 104 upon the application of external pressure.

Various technologies have been proposed to deal with the above drawbacks in a touch-panel input device. However, no adequate technology has been found to overcome the above described difficulties which can be easily implemented. Generally, solutions to the problem of sealing a transparent insulative fluid in a gap to improve transmittance have been extremely difficult to implement.

OBJECTS AND SUMMARY OF THE INVENTION

In view of the above discussion, it is an object of the present invention to overcome the drawbacks of the prior art.

It is also an object of the present invention to provide a touch-panel input device that reduces the gap between the conductor layers.

It is a further object of the present invention to provide a touch-panel input device that offers reliable detection of positions indicated by pressure.

It is still another object of the present invention to provide a touch-panel input device with a uniform operational tactile response, even when pressure is applied to an area near a corner or side of the input device.

A still further object of the present invention is to provide a touch-panel input device that offers reduced reflectivity, improved transmittance, quick responsiveness and uniform transmittance, even when the device is tilted.

Briefly stated, two transparent conductive panels are separated by a perimeter of elastic adhesive that forms a sealed gap in which transparent insulative fluid is interposed. The fluid has a refraction index close to that of the panels to improve light transmittance through the device. The small width of the gap improves response time and prevents formation of a vacuum in the gap. The panels are connected to a position detection circuit that determines coordinate position of an applied pressure point. Spacers in the gap reduce the chance of accidental large-area contact which would result in an erroneous position command. The elasticity of the adhesive and the small gap width provide better temperature variation tolerance in addition to improved consistency and reliability of operation.

According to an embodiment of the present invention, there is provided a touch-panel input device comprising: at least first and second transparent plates having faces opposed to one another and substantially parallel, a portion of said opposing faces of said at least first and second transparent plates being transparent electrically conductive surfaces with uniform surface resistance, an elastic adhesive disposed around a perimeter of said conductive surfaces, whereby said opposing faces are bonded together and separated by a sealed gap having a uniform width, a transparent insulative fluid interposed in said sealed gap, said fluid having a refraction index close to that of said transparent plates, at least one of said at least first and second transparent plates capable of resiliently flexing toward an other of said transparent plates, whereby an electrical relationship is changed between said conductive surfaces and said relationship is related to a coordinate position on said device.

According to a method of the present invention there is provided a method for constructing a touch-panel input device comprising steps of: forming transparent conductive layers with conductive leads on portions of at least two transparent plates, disposing a curable reactive adhesive on a perimeter of one of said conductive layers, curing said reactive adhesive to form an elastic pressure sensitive adhesive with a specified height above said transparent plate, applying a conductive bonding agent to an external connector, positioning said external connector in a region outside of a space defined by said adhesive and in contact with said conductive leads, pressing said transparent plates together with said conductive layers being opposed thereby bonding said transparent plates together and forming a sealed gap between said conductive layers and interposing an insulative transparent fluid in said gap, said fluid having a refraction index near that of said transparent plates.

According to another embodiment of the present invention there is provided a touch-panel input device comprising: at least first and second transparent plates having faces opposed to one another and substantially parallel, transparent electrically conductive layers disposed on each of said opposing faces, said conductive layers having substantially uniform surface resistance and transparent electrical connection leads disposed on opposing ends of said conductive layers, pairs of said connection leads of said conductive layers defining a coordinate axis, regularly spaced insulative protrusions on at least one of said conductive layers effective to slightly increase and evenly distribute pressure applied to said transparent plates needed to cause contact between said conductive layers, an elastic adhesive disposed around a perimeter of said conductive layers, whereby said opposing faces are bonded together and separated by a sealed gap having a substantially uniform width, transparent insulative fluid interposed in said sealed gap, said fluid having a refraction index close to that of said transparent plates and an external connector connected to said leads.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
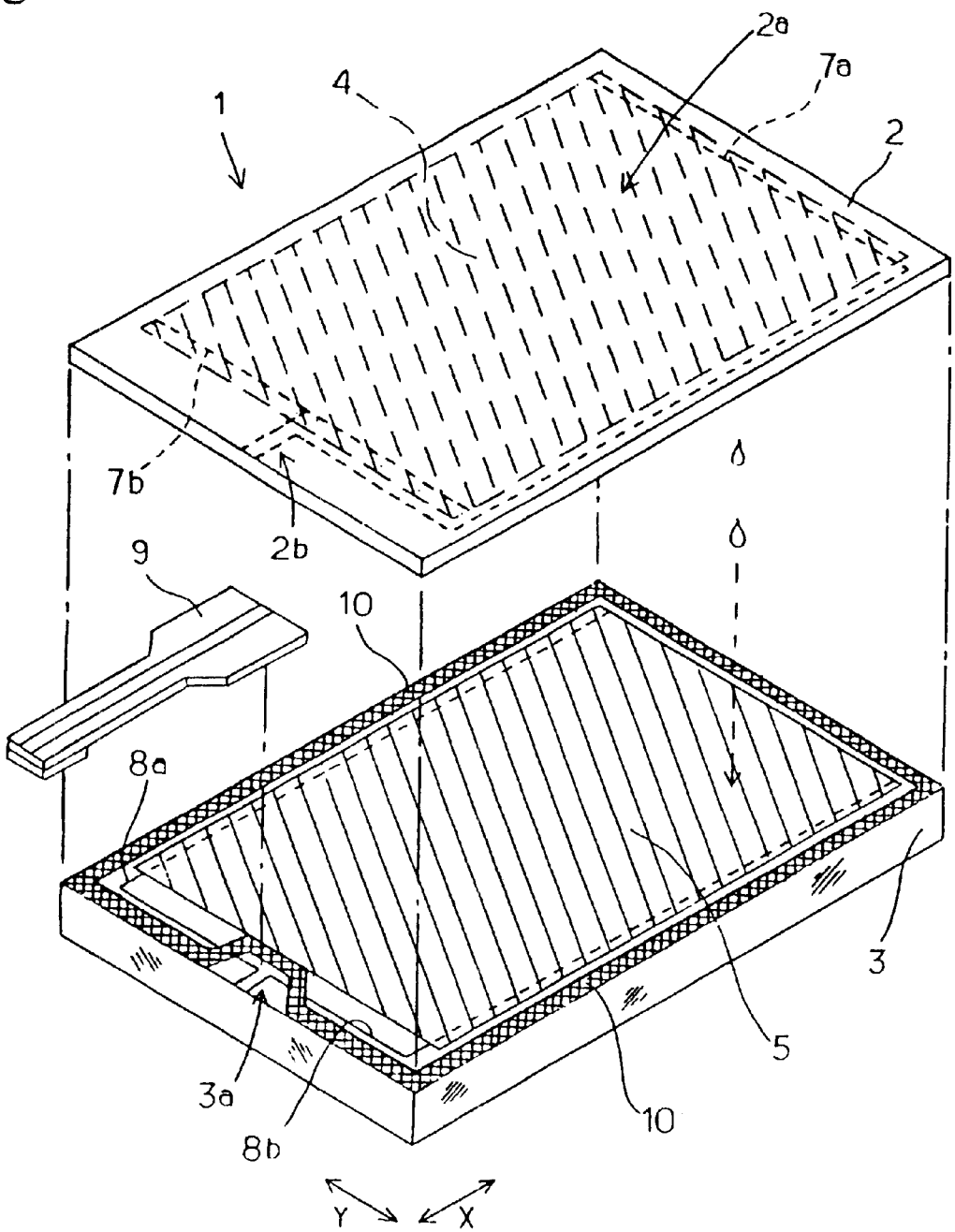
FIG. 1 is an exploded perspective drawing of a touch-panel input device according to the present invention.
Figure 2:
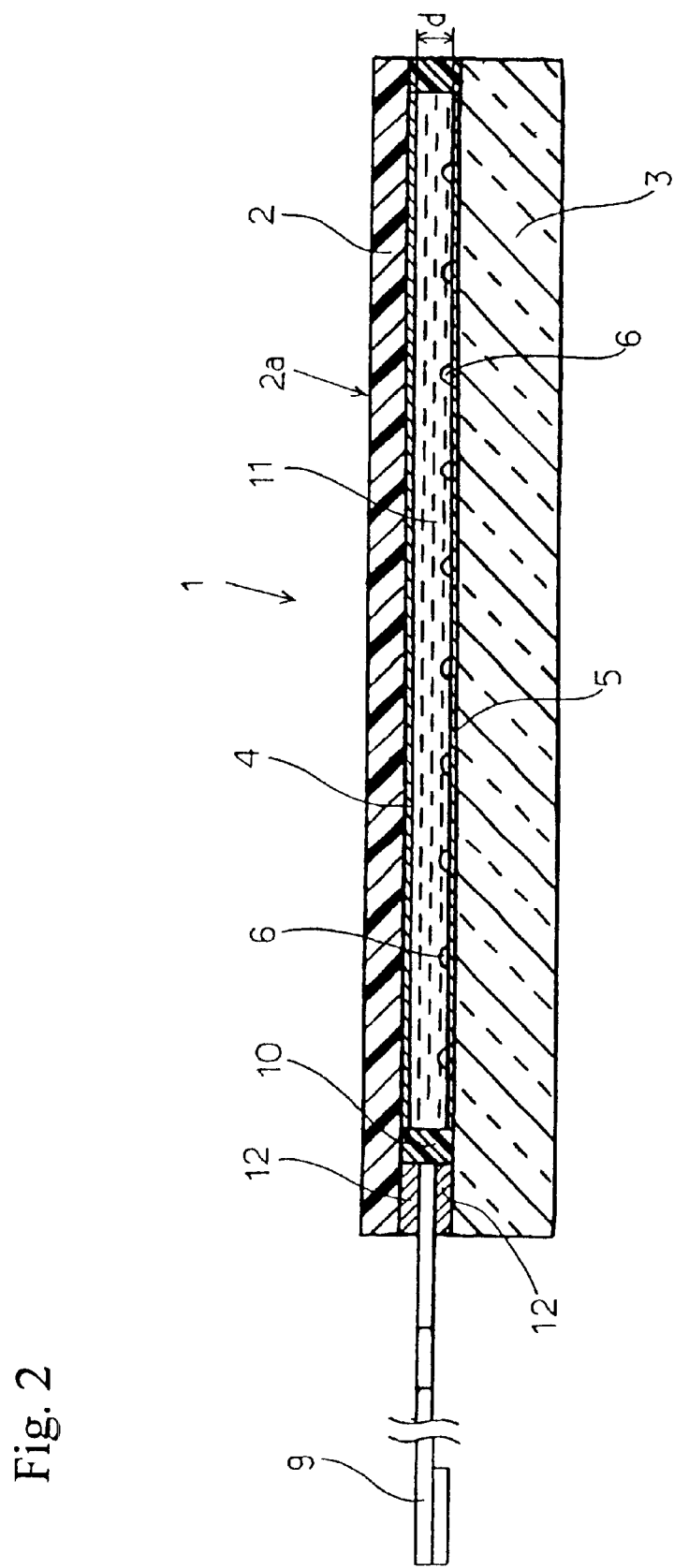
FIG. 2 is a vertical cross-section drawing of a touch-panel input device according to the present invention, in which a transparent insulative fluid is sealed.

Referring to FIGS. 1 and 2, an analog touch-panel device 1 includes an upper transparent plate 2 and a lower transparent substrate 3. Upper transparent plate 2 is a molded flexible sheet composed of a transparent synthetic resin such as, for example, polyethylene terephthalate (PET). Other examples of materials that can be used to construct upper transparent plate 2 include polycarbonate (PC), polyether sulfone (PES) and polyimide (PI). Other materials can be used as long as they are transparent and have a suitable degree of flexibility.

Upper transparent plate 2 serves as the top of touch-panel input device 1. A transparent hard-coat layer is applied to an upper surface of upper transparent plate 2 to protect the upper surface and to form a pressure input surface 2a.

Lower transparent substrate 3 serves as a bottom transparent plate of touch-panel input device 1. Lower transparent substrate 3 is disposed beneath and parallel to upper transparent plate 2. Lower transparent substrate 3 can be formed using the same material as upper transparent plate 2. However, the present embodiment uses a thin, rectangular plate formed from soda-lime glass as lower transparent substrate 3.

A movable conductor layer 4 and a fixed conductor layer 5 are fixed to opposing surfaces of upper transparent plate 2 and lower transparent substrate 3. Conductor layers 4, 5 are transparent conductive films of uniform thickness, with uniform resistance across the surface areas of the respective plates to which they are affixed.

Movable conductor layer 4 and fixed conductor layer 5 are both composed of ITO and have uniform thickness. The uniform thickness of each layer enables a uniform resistance per unit of surface area for each conductive layer 4, 5. An undercoat of silicon film or the like (not shown in the figures) is disposed between an upper surface of lower transparent substrate 3 and fixed conductor layer 5. The undercoat acts as a barrier to prevent an alkaline component of lower transparent substrate 3 from contaminating other portions of touch-panel input device 1.

Referring to FIG. 2, dot spacers 6, composed of an insulative synthetic resin, are fixed at 1 mm or 2 mm intervals on fixed conductor layer 5. Dot spacers 6 prevent accidental contact between movable conductor layer 4 and fixed conductor layer 5. Examples of accidental contact include such instances when a person's hand or the like unintentionally applies pressure to a section of pressure input surface 2a. Dot spacers 6 have a height of about 5 microns, which is less than a height of a gap d between movable conductor layer 4 and fixed conductor layer 5.

Referring again to FIG. 1, an X potential lead 7a and an X ground lead 7b are transparent conductors printed on a lower surface of upper transparent plate 2. X leads 7a, 7b are electrically connected to opposing ends of movable conductor layer 4 along an X-axis direction. Each of X leads 7a, 7b have an end that extends to an external connection section 2b located on upper transparent plate 2. External connection section 2b provides an electrical connection between X leads 7a, 7b and an external circuit.

Similarly, a Y potential lead 8a and a Y ground lead 8b are transparent conductors printed on the upper surface of lower transparent substrate 3. Y leads 8a, 8b are electrically connected to opposing ends of fixed conductor layer 5 along a Y-axis direction which is perpendicular to the X-axis direction. Each of Y leads 8a, 8b have an end that extends to an external connection section 3a located on lower transparent substrate 3. External connection section 3a provides an electrical connection between Y leads 8a, 8b and an external circuit. External connection section 3a faces external connection section 2b.

Figure 3:
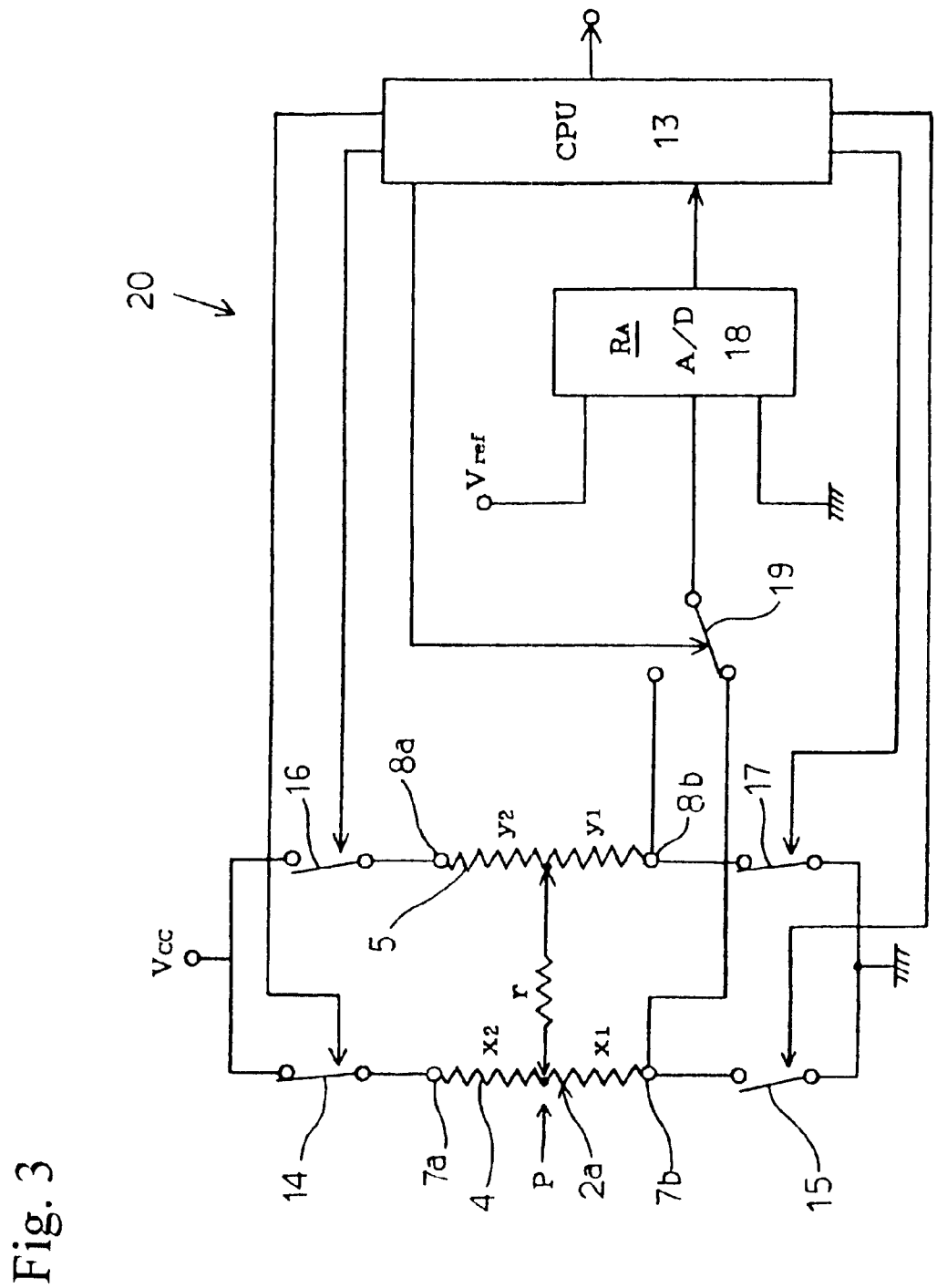
FIG. 3 is a circuit diagram of a position detection circuit with a pressure input.
Figure 4:
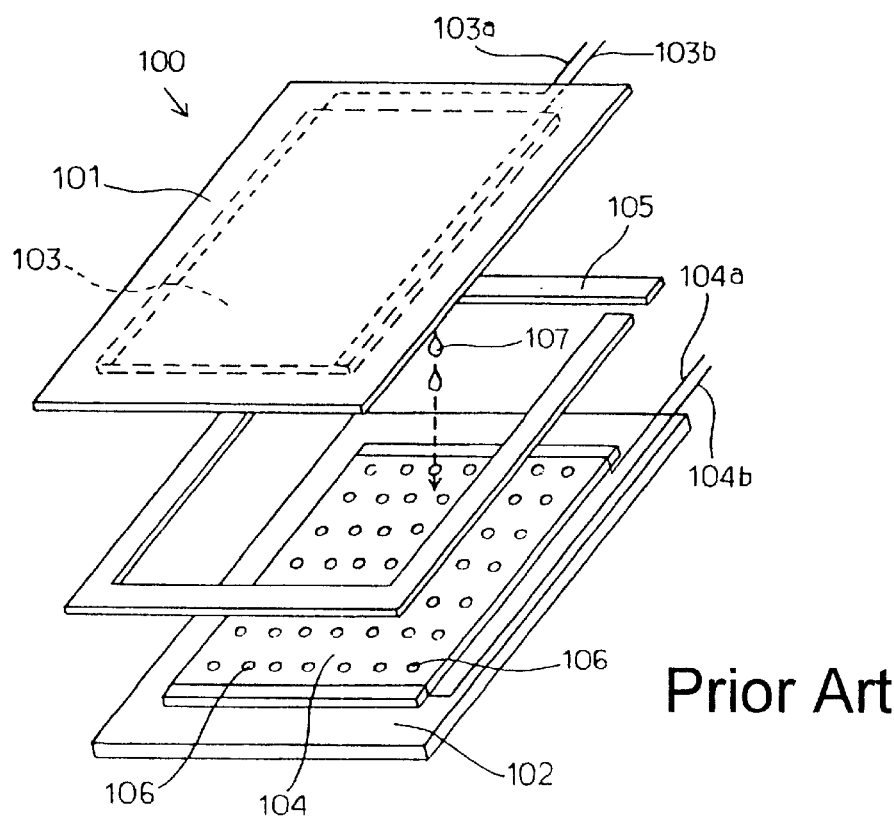
FIG. 4 is an exploded perspective drawing showing a conventional touch-panel input device.
Figure 5:
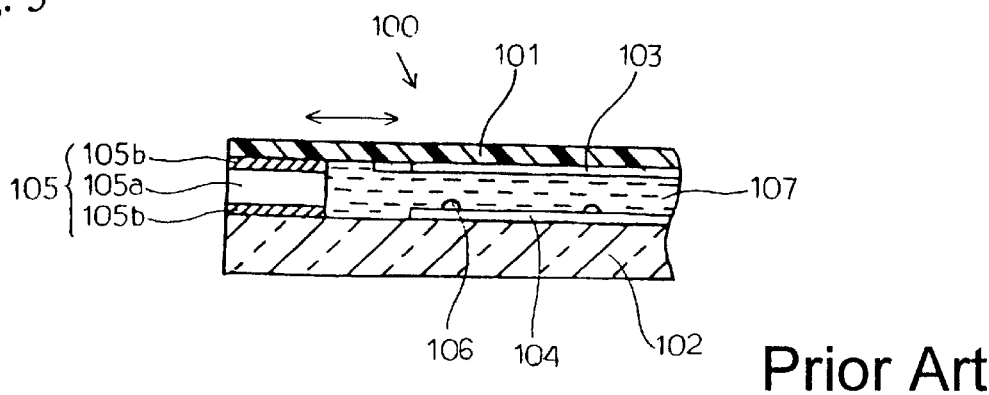
FIG. 5 is a schematic cross-section drawing of a conventional touch-panel input device.

Referring to FIG. 2, X and Y leads 7a, 7b, 8a, 8b that extend to external connection sections 2b, 3a, are connected to a flexible substrate 9 with a conductive adhesive 12. Flexible substrate 9 has printed patterns on upper and lower surfaces to provide electrical connections that correspond with connection sections 2b, 3a. Flexible substrate 9 is also electrically connected to a pressure position detecting circuit 20 to provide an electrical path for X and Y leads 7a, 7b, 8a and 8b, as shown in FIG. 3.

Upper transparent plate 2 and lower transparent substrate 3 are fixed to each other by a reactive adhesive disposed around conductor layers 4, 5. The reactive adhesive exhibits elasticity and tacking properties (e.g., Acheson Corp. product number ML-25251). The reactive adhesive cited as an example is an ultraviolet-curing pressure-sensitive adhesive, suitable for screen-printing. The thickness at which the reactive adhesive is applied can be adjusted to a specified value. For example, the reactive adhesive can be applied by printing to obtain a thickness of 40 microns measured from the upper surface of lower transparent substrate 3. In this instance, the reactive adhesive is defined as a bonding agents having 100% solid content and containing no solvents.

Referring to FIG. 1, the reactive adhesive is printed on the upper surface of lower transparent substrate 3 in a pattern that surrounds fixed conductor layer 5 while avoiding obstruction of external connection section 3a. This pattern of printing permits external connection section 3a to connect with flexible substrate 9 through conductive adhesive 12, without being blocked by the reactive adhesive.

Once printed on lower transparent substrate 3, the reactive adhesive is exposed to a source of ultraviolet rays. The molecules of the reactive adhesive are thus bonded after a few seconds exposure, effectively curing the reactive adhesive. The reactive adhesive hardens and is thus transformed into an adhesive layer 10 that exhibits elasticity.

Referring to FIG. 2, upper transparent plate 2 and lower transparent substrate 3 are assembled and pressed together. Adhesive layer 10 provides a separation between upper transparent plate 2 and lower transparent substrate 3 in this assembled state. Upper transparent plate 2 and lower transparent substrate 3 are then pressed together, thereby engaging the pressure sensitivity characteristic of adhesive layer 10. Opposing surfaces of upper transparent plate 2 and lower transparent substrate 3 are thus bonded together by adhesive layer 10. In this configuration, opposing movable conductor layer 4 and fixed conductor layer 5 face each other across a uniform gap d. Gap d is approximately 40 microns in width, which is substantially the same as the height of adhesive layer 10.

The reactive adhesive used in the above described embodiment exhibits elasticity upon hardening. The characteristic of elasticity permits upper transparent plate 2 to move elastically in a horizontal direction that is parallel to the X, Y plane. The capability of elastic movement is in a horizontal direction relative to adhesive layer 10 and lower transparent substrate 3. This configuration permits a reliable contact between conductor layers 4, 5 even when pressure is applied to input surface 2a in a region near adhesive layer 10. In such an instance, upper transparent plate 2 flexes elastically inward toward lower transparent substrate 3 to provide a consistent, resilient mechanism for creating contact between conductor layers 4, 5.

At the same time that upper transparent plate 2 and lower transparent substrate 3 are bonded together, transparent insulative fluid 11 is injected into the space between the two plates. Transparent insulative fluid 11 is injected into the space formed by gap d between movable conductor layer 4 and fixed conductor layer 5. Adhesive layer 10 forms a border surrounding the space defined by gap d so that the space is completely enclosed. Transparent insulative fluid 11 entirely fills, and is completely sealed within, the space defined by gap d and adhesive layer 10. This configuration prevents any external leakage of transparent insulative fluid 11 from touch-panel input device 1.

Gap d formed according to the above description is approximately 40 microns in width. The surface tension of insulative fluid 11 located in the narrow space defined by gap d and adhesive layer 10 overcomes the weight of insulative fluid 11. This feature permits touch-panel input device 1 to be vertically oriented, without creating a vacuum cavity in the space defined by gap d and adhesive layer 10. Accordingly, touch-panel input device 1 can be oriented in any given direction without forming a vacuum cavity in the defined space which would degrade the light transmittance of the display image, making it difficult to view.

Since the reactive adhesive in adhesive layer 10 is 100% solid and contains no solvents, there is no risk of solvents dissolving in transparent insulative fluid 11. Transparent insulative fluid 11 can thus contact adhesive layer 10 in the sealed space between plates, without being contaminated by solvents. Transparent insulative fluid 11 therefore suffers no degradation in transparency or insulative properties which would result from solvent contamination.

Various fluids can be used for transparent insulative fluid 11, as long as they are transparent. Some examples include fresh water, paraffin-based oils, petroleum-based oils, vegetable oil and silicon oil. The present embodiment of the invention uses a silicon oil having a viscosity of 5 cp. The use of silicon oil facilitates adjustments in the oil's viscosity which is a factor in pressing force.

Silicon oil has a refraction index of 1.4, which is closer to the refraction index of ITO (1.9) than that of air (1.0). Introducing silicon oil into the gap between conductor layers 4, 5 significantly reduces light reflectance at boundaries between the gap and conductor layers 4, 5 over a gap containing air alone. The silicon oil directly contacts conductor layers 4, 5, thus increasing overall light transmittance of the touch-panel input device 1 to 90% or more.

The presence of transparent insulative fluid 11 requires a gently curved surface pressing against pressure input surface 2a to exert greater pressure to make adequate contact between conductor layers 4, 5 in some cases. The tip of a person's finger is such an example of a gently curved surface requiring greater applied pressure. Accordingly, a conductive powder consisting of particles having a diameter slightly smaller than the height of dot spacers 6 (e.g., between 3 and 4 microns) is dispersed in transparent insulative fluid 1. Introduction of the conductive powder into transparent insulative fluid 11 enables electrical connections to be made between movable conductor layer 4 and fixed conductor layer 5. Pressure applied to pressure input surface 2a produces an electrical path between movable conductor layer 4 and fixed conductor layer 5 through the particles of the conductive powder. This arrangement enables detection of position resulting from even a lightly applied pressure from a gently curving surface, such as a person's finger.

Referring to FIG. 3, a position detection circuit 20 is shown with a pressure input P. Position detection circuit 20 is part of touch-panel input device 1, which is attached over a display (not shown). A pen, finger, or the like applies pressure to pressure input surface 2a in a position indicated by the display visible through touch-panel input device 1. The applied pressure results in pressure input P, which indicates a position on touch-panel input device 1. Pressure input P is converted to an analog signal which represents position coordinates. The analog signal is converted into command input data for use by a processing device such as, for example, a personal computer (not shown).

Movable conductor layer 4 and fixed conductor layer 5 are both formed to have uniform resistance across their respective surface areas. Thus, a coordinate detection voltage applied to potential leads 7a, 8a of conductive layers 4, 5 produces potential gradients with equal slopes when ground leads 7b, 8b are grounded. The applied voltage produces a potential proportional to the distance from a given lead to a position where conductive layers 4, 5 make electrical contact. A potential is therefore generated when pressure is applied to a given point on touch-panel input device 1 that is proportional to the distance from the given point to a conductive lead.

Detection of the position indicated by applied pressure is controlled by a CPU 13. CPU 13 first sets up an X coordinate detection mode by closing switches 14, 15 while opening switches 16, 17. Referring momentarily to FIG. 1, switches 14, 15 enable position measurement in a direction indicated by arrow X, while switches 16, 17 enable position measurement in a direction indicated by arrow Y. Referring again to FIG. 3, a switch 19 is connected to lead 8b on one side, and to an input terminal of an A/D converter 18 on another side.

When pressure is applied to a point P on pressure input surface 2a with position coordinates (Xp, Yp), an electrical connection is made between movable conductor layer 4 and fixed conductor layer 5. A voltage potential Vxp at point P on movable conductor layer 4 is given by the equation Vcc * x1/(x1+x2). In this equation, variable x2 represents the resistance of movable conductor layer 4 over a distance from the point of contact to lead 7a on the X potential side. Variable x1 represents the resistance of movable conductor layer 4 over a distance from the point of contact to lead 7b on the X ground side. A/D converter 18 reads the voltage potential Vxp on an input terminal and provides a representative digital value to CPU 13 to determine the x coordinate (Xp).

CPU 13 then sets up a Y coordinate detection mode by opening switches 14, 15 and closing switches 16, 17. Switch 19 is connected to an input terminal of A/D converter 18 on one side, and connected to lead 7b of movable conductor layer 4 on the other side.

A voltage potential Vyp at point P on fixed conductor layer 5 is given by the equation Vcc * y1/(y1+y2). In this equation, variable y2 represents the resistance over a distance from the point of contact to lead 8a on the Y potential side. Variable y1 represents the resistance over a distance from the point of contact to lead 8a on the Y ground side. A/D converter 18 reads the voltage potential Vyp on an input terminal to determine the y coordinate (Yp).

The coordinate position resulting from the pressure applied to pressure input surface 2a can then be detected by alternately activating the X and Y coordinate detection modes. An X coordinate is read each time the X coordinate detection mode is activated, and a Y coordinate is read each time the Y coordinate detection mode is activated.

The above described touch-panel input device 1 is of an analog type device. However, a digital type touch-panel input device 1 can also be constructed. In a digital type device, movable conductor layer 4 and fixed conductor layer 5 are divided into multiple strips of movable contact pieces and fixed contact pieces, respectively. These strips are bonded to opposing surfaces of upper transparent plate 2 and lower transparent substrate 3 to form perpendicular intersections. The intersections of the strips forms a matrix of contact positions which detect position when pressure is applied by making a connection at a corresponding intersection. The contact position, i.e., the point at which pressure is applied on transparent plate 2, is detected by movable contact pieces and fixed contact pieces that contact each other.

Moreover, dot spacers 6 disposed to prevent accidental contact between conductor layers 4, 5 can alternatively be eliminated. For example, the viscosity of transparent insulative fluid 11 can be adjusted to prevent unintended contact between conductor layers 4, 5 in response to light pressure. This alternative of eliminating dot spacers 6 also avoids the production steps required to affix dot spacers 6 to fixed conductor layer 5.

In addition, upper transparent plate 2 and lower transparent substrate 3 have movable conductor layer 4 and fixed conductor layer 5 bonded to lower and upper surfaces, respectively. However, upper transparent plate 2 can be formed as a movable conductor layer 4, i.e., a single movable conductor plate replaces the plate and conductor layer combination. Similarly, lower transparent substrate 3 can be formed as a fixed conductor layer, i.e., a single fixed conductor plate replaces the substrate and conductor layer combination.

Alternative adhesives, such as a thermosetting adhesive, could also be used in place of the ultraviolet-curing adhesive that serves as the reactive adhesive.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A touch-panel input device comprising:
    at least first and second transparent plates having faces opposed to one another and substantially parallel;
    a portion of said opposing faces of said at least first and second transparent plates being transparent electrically conductive surfaces with uniform surface resistance;
    an elastic adhesive disposed around a perimeter of said conductive surfaces, whereby said opposing faces are bonded together and separated by a sealed gap having a uniform width;
    a transparent insulative fluid interposed in said sealed gap, said fluid having a refraction index close to that of said transparent plates;
    at least one of said at least first and second transparent plates capable of resiliently flexing toward an other of said transparent plates, whereby an electrical relationship is changed between said conductive surfaces; and
    said relationship is related to a coordinate position on said device.

2. A touch-panel input device according to claim 1, wherein:
    said relationship is a voltage drop across a resistance provided by an electrical connection; and
    said voltage drop is related to said coordinate position on said device by a proportional relationship.

3. A touch-panel input device according to claim 1, wherein said width of said gap is in the range of from 5 to 50 microns.

4. A touch-panel input device according to claim 1, wherein said adhesive is composed substantially of solids.

5. A touch-panel input device according to claim 1, wherein said transparent insulative fluid has a viscosity with a surface tension within said gap that overcomes a weight of said fluid, thereby preventing formation of a vacuum cavity in said gap when an orientation of said device is changed.

6. A touch-panel input device according to claim 1, wherein said elastic adhesive is ultraviolet light curable and provides pressure sensitive bonding.

7. A touch-panel input device according to claim 6, wherein said width of said gap is in the range of from 5 to 40 microns.

8. A touch-panel input device according to claim 1, wherein said elastic adhesive is thermosetting curable and provides pressure sensitive bonding.

9. A touch-panel input device according to claim 1, wherein said transparent conductive surfaces are transparent conductive layers disposed on said transparent plates with uniform thickness.

10. A touch-panel input device according to claim 9, wherein said transparent conductive layers are composed of Indium Titanium Oxide (ITO).

11. A touch-panel input device according to claim 9, further including:
    transparent electrical connection leads on opposing ends of each of said transparent conductive layers;
    an external connector;
    said leads connected to said external connector; and
    said external connector effective to provide electrical connection to each of said leads from a device external to said touch-panel input device.

12. A touch-panel input device according to claim 11, wherein:
    each of said transparent conductive layers includes a plurality of parallel strips; and
    said pluralities on said opposing faces being substantially perpendicular to each other.

13. A touch-panel input device according to claim 11, wherein said external connector is electrically connected to an external device having a circuit effective to measure a selected voltage drop along a path through said conductive surfaces to determine a coordinate position indicated by said electrical connection between said transparent conductive surfaces.

14. A touch-panel input device according to claim 13, wherein:
    said circuit includes a DC voltage source;
    a controller for controlling input/output and switches;
    a first switch connected in series between said voltage source and a first lead on said flexible transparent conductive surface;
    a second switch connected in series between said voltage source and a first lead on said rigid transparent conductive surface;
    a third switch connected in series between a second lead on said flexible transparent conductive surface and ground;
    a fourth switch connected in series between a second lead on said rigid transparent conductive surface and ground;
    an input of an analog to digital converter connected through a fifth switch to said second leads on said conductive surfaces;
    said controller receiving an output of said analog to digital controller; and
    said controller effective to control said switches to measure a first voltage across a first resistor network formed by contact between said transparent conductive surfaces and to measure a second voltage across a second resistor network formed by said contact, thereby effective to determine a coordinate position of said contact.

15. A touch-panel input device according to claim 9, further including:
    a transparent barrier layer between said fixed transparent plate and said transparent conductive layer disposed on said fixed transparent plate; and
    said barrier layer effective to prevent contamination of said fluid.

16. A touch-panel input device according to claim 1, further including:
    regularly spaced insulative protrusions disposed on at least one of said opposing surfaces of said at least first and second transparent plates; and
    said protrusions effective to slightly increase and evenly distribute pressure applied to said flexible transparent plates necessary to change said electrical relationship between said conductive surfaces.

17. A touch-panel input device according to claim 16, wherein a height of said protrusions is substantially less than said width of said gap.

18. A touch-panel input device according to claim 16, wherein said protrusions are 5 microns in height or less.

19. A touch-panel input device according to claim 16, further including:
    a conductive powder dispersed in said fluid;
    said powder having particles with a diameter slightly less than a height of said protrusions; and
    said powder effective to decrease the amount of pressure per unit of surface area applied to said flexible transparent plate necessary to change said electrical relationship between said conductive surfaces.

20. A touch-panel input device according to claim 1, wherein said elastic adhesive is sufficiently elastic to permit said electrical relationship to change by application of external pressure near said perimeter without loss of resiliency or adversely affecting said sealed gap.

21. A touch-panel input device according to claim 1, wherein said elastic adhesive exhibits elasticity sufficient to permit said flexible transparent plate to move resiliently in a direction parallel to said rigid transparent plate.

22. A method for constructing a touch-panel input device comprising steps of:
    forming transparent conductive layers with conductive leads on portions of at least two transparent plates;
    disposing a curable reactive adhesive on a perimeter of one of said conductive layers;
    curing said reactive adhesive to form an elastic pressure sensitive adhesive with a specified height above said transparent plate;
    applying a conductive bonding agent to an external connector;
    positioning said external connector in a region outside of a space defined by said adhesive and in contact with said conductive leads;
    pressing said transparent plates together with said conductive layers being opposed thereby bonding said transparent plates together and forming a sealed gap between said conductive layers; and
    interposing an insulative transparent fluid in said gap, said fluid having a refraction index near that of said transparent plates.

23. A method for constructing a touch-panel input device according to claim 22, further including connecting said external connector to a position detection circuit.

24. A method for constructing a touch-panel input device according to claim 22, further including a step of depositing insulative protrusions at regularly spaced intervals on at least one of said at least two transparent plates.

25. A method for constructing a touch-panel input device according to claim 24, further including a step of dispersing a conductive powder in said insulative transparent fluid.

26. A touch-panel input device comprising:

at least first and second transparent plates having faces opposed to one another and substantially parallel;

transparent electrically conductive layers disposed on each of said opposing faces, said conductive layers having substantially uniform surface resistance and transparent electrical connection leads disposed on opposing ends of said conductive layers;

pairs of said connection leads of said conductive layers defining a coordinate axis;

regularly spaced insulative protrusions on at least one of said conductive layers effective to slightly increase and evenly distribute pressure applied to said transparent plates needed to cause contact between said conductive layers;

an elastic adhesive disposed around a perimeter of said conductive layers, whereby said opposing faces are bonded together and separated by a sealed gap having a substantially uniform width;

transparent insulative fluid interposed in said sealed gap, said fluid having a refraction index close to that of said transparent plates; and an external connector connected to said leads.

27. A touch-panel input device according to claim 26 further comprising:

a position detection circuit connected to said external connector;

at least one of said transparent plates capable of resiliently flexing to change an electrical relationship between said conductive layers; and said change in said relationship being measurable by said circuit effective to determine a point on said coordinate axis where said change in said relationship occurs.

28. A touch-panel input device according to claim 26, further including a conductive powder dispersed in said insulative fluid effective to decrease applied pressure needed to form said electrical connection.

29. A touch-panel input device according to claim 26, further including:

a transparent barrier layer between one of said conductive layers and said transparent plates; and a transparent hard coat layer on an external surface of another of said transparent plates.

\* \* \* \* \*